United States Patent [19]

Takada

[11] 4,456,195
[45] * Jun. 26, 1984

[54] EMERGENCY LOCKING VEHICLE SAFETY BELT RETRACTOR

[76] Inventor: Juichiro Takada, 3-12-1, Shinmachi, Setagayaku, Tokyo, Japan

[*] Notice: The portion of the term of this patent subsequent to Jul. 12, 2000 has been disclaimed.

[21] Appl. No.: 327,029

[22] Filed: Dec. 3, 1981

[30] Foreign Application Priority Data

Dec. 17, 1980 [JP] Japan ................................ 55-177135

[51] Int. Cl.³ ........................ A62B 35/02; B65H 75/48
[52] U.S. Cl. ........................... 242/107.4 B; 242/107.3; 242/107.4 A
[58] Field of Search ................ 242/107.4 B, 107.4 A, 242/107.3; 297/478; 280/806

[56] References Cited

U.S. PATENT DOCUMENTS

| | | | |
|---|---|---|---|
| 2,587,652 | 3/1952 | Rostine | 242/107.3 |
| 3,889,897 | 6/1975 | Zelderen | 242/107.3 |
| 3,979,083 | 9/1976 | Fohl | 242/107.4 B |
| 4,278,216 | 7/1981 | Takada | 242/107.4 B |
| 4,392,620 | 7/1983 | Takada | 242/107.4 B X |

*Primary Examiner*—John M. Jillions
*Attorney, Agent, or Firm*—Brumbaugh, Graves, Donohue & Raymond

[57] ABSTRACT

An emergency locking retractor of the type that has a cam wheel and an inertia wheel having coacting cam elements that cause either the cam wheel or the inertia wheel to shift axially and thereby engage locking ratchet teeth to lock the wheel from rotation includes a brake member carried by the cam wheel and activated by the centrifugal reaction force due to rotation of the cam wheel at high velocity to move outwardly into engagement with a circumferential cylindrical wall portion of the casing for the locking device and thereby retard the velocity of rotation of the belt reel in the winding direction. By so limiting the rotational velocity of the cam wheel, the inertia wheel is kept from running ahead of the cam wheel in the winding direction, thereby preventing the camming action of the cam elements and any possibility of damaging, interfering contact between the locking ratchet teeth.

2 Claims, 2 Drawing Figures

EMERGENCY LOCKING VEHICLE SAFETY BELT RETRACTOR

FIELD OF THE INVENTION

The present invention relates to emergency locking vehicle safety belt retractors and, in particular, to an improvement in such retractors that prevents the locking ratchet teeth of the reel locking mechanism from coming into contact when the belt is stopped suddenly as it is being rewound onto the reel.

BACKGROUND OF THE INVENTION

U.S. patent application Ser. No. 267,890 filed May 28, 1981, now U.S. Pat. No. 4,392,620 and entitled Emergency Locking Retractor for a Vehicle Occupant Restraint Belt describes and illustrates two embodiments of the type of emergency locking retractor in which the locking device responds to rapid pull-out of the belt as well as to acceleration of an inertia responsive device. Retractors of this type usually include an inertia wheel that rotates at the same speed as the belt reel when the reel is pulled out relatively slowly but lags behind the belt reel, due to inertia, when the belt is pulled out rapidly. The inertia wheel ordinarily works in conjunction with an inertia spring that maintains a fixed relationship between the positions of the belt reel and the inertia wheel up to some selected rate of change in the velocity of rotation. When the selected rate of change in the velocity of rotation of the reel is exceeded, the rotational inertia of the inertia wheel causes it to lag behind the belt reel. The inertia wheel works in conjunction with a cam wheel that produces axial motion of either the cam wheel or the inertia wheel. The axially movable wheel of the mechanism has locking ratchet teeth that engage corresponding complementary ratchet teeth on the side member of a frame of the retractor. A series of ratchet teeth around the circumference of the inertia wheel work with an inertia responsive device, such as a pawl operated by a movable mass that stops rotation of the inertia wheel and causes the cam mechanism to engage the locking ratchet teeth and lock the reel against rotation.

A problem with this type of locking mechanism is that the same change in the relative rotational positions of the inertia wheel and cam wheel that causes the locking mechanism to lock the reel from rotation when the belt is pulled out from the reel can also occur when the belt is being rewound onto the reel and is abruptly stopped in the course of rewinding. In this case, the rotational inertia of the inertia wheel can cause it to run ahead of the cam wheel, thereby causing the same motion of the axially movable wheel toward the side frame of the retractor. Of course, the retractor will not lock, but the locking ratchet teeth on the side member of the frame and on the axially movable wheel come into contact as a result of the inward camming of the axially movable wheel as the inertia wheel runs ahead in rotation of the cam wheel. Over a period of time, repeated contact between the locking ratchet teeth can wear away the tips of the teeth and ultimately reduce the effectiveness of operation of the locking mechanism.

SUMMARY OF THE INVENTION

In accordance with the present invention, the problem of undesirable contact between the locking ratchet teeth of the locking mechanism of an emergency locking retractor of the type described generally above is overcome by providing a braking mechanism for preventing the belt reel from rewinding so rapidly that should that rewinding be abruptly interrupted and the reel be rapidly decelerated, the camming action resulting from the inertia wheel running ahead of the rapidly decelerating belt reel would cause contact between the locking ratchet teeth of the retractor. In particular, the invention is characterized in that an element that rotates with the belt reel, preferably the cam wheel, carries a movable brake member that works in conjunction with a circumferential portion of a cover for the locking mechanism, which portion is concentric to the axis of rotation to the belt reel, to brake the rotation of the reel in the winding direction. Inasmuch as the magnitude of the deceleration of the belt reel is a function of the initial velocity of the belt reel during rewinding and the time during which the deceleration occurs, a reduction in the initial velocity of the reel, considered in conjunction with the probability that the time during which deceleration occurs will not vary greatly, necessarily reduces the deceleration of the belt reel and, of course, the cam wheel, which rotates with the belt reel. Accordingly, maintaining a relatively low velocity of rotation of the reel in the rewinding direction at all times ensures that the belt reel will not be decelerated at such a rate as to cause the inertia wheel to run ahead of the cam wheel, thereby producing contact between the locking ratchet teeth.

In a preferred embodiment of the invention the retractor is characterized in that the brake member is mounted on the cam wheel to pivot about an axis spaced apart circumferentially with respect to the cam wheel from the center of gravity of the brake member and in that there is a spring resiliently urging the brake member away from the cylindrical wall portion of the cover against which it works.

For better understanding of the invention, reference may be made to the following description of an exemplary embodiment, taken in conjunction with the figures of the accompanying drawing.

DESCRIPTION OF THE EXEMPLARY EMBODIMENT

Figure 1:
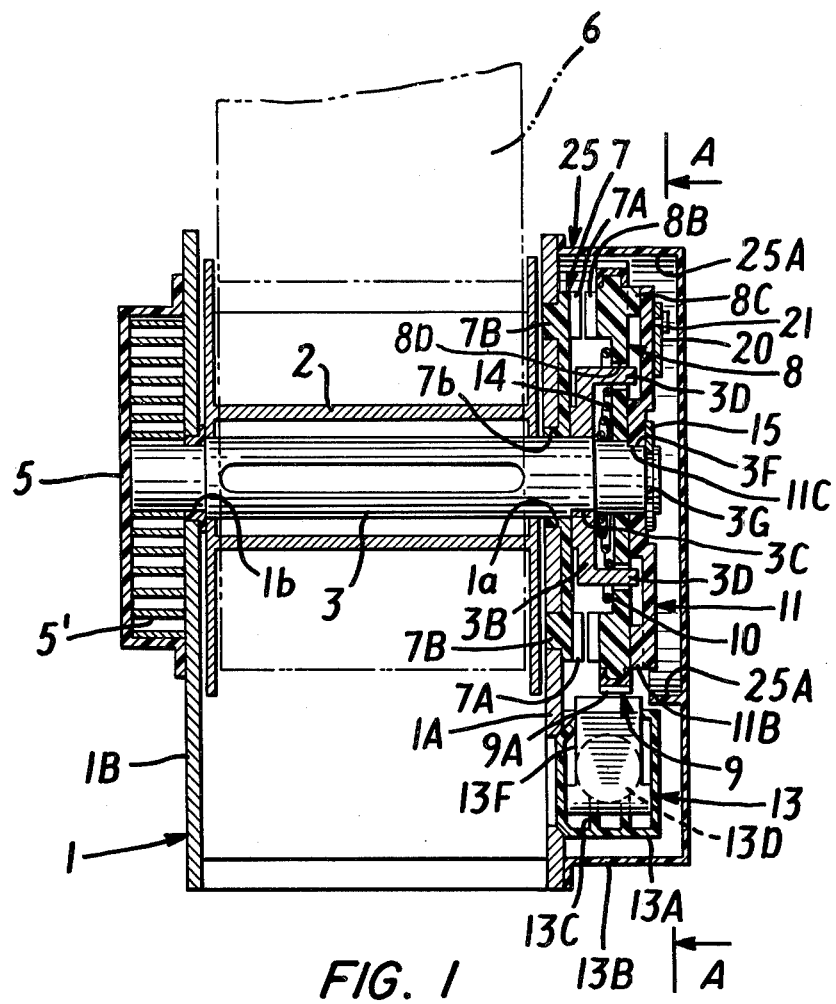
FIG. 1 is an end cross-sectional view of the embodiment taken generally through the axis of the belt reel shaft.

Except for the improvement provided in accordance with the present invention, the embodiment of an emergency locking retractor shown in FIG. 1 of the drawings is identical to the embodiment shown in FIGS. 4 to 6 of the aforementioned U.S. Pat. No. 4,392,620. That application is hereby incorporated by reference into this specification, and may be referred to for a full description of the construction and mode of operation of the retractor.

The side flange portions 1A and 1B of a U-shaped frame 1 rotatably support a belt reel 2 by means of a reel shaft 3 that is received in holes 1a and 1b in the side flange portions. A spring 5' that is enclosed within a cover 5 affixed to the flange portion 1B urges the belt reel 2 to rotate in a direction such as to rewind a belt 6 onto the reel while allowing the belt 6 to be pulled from the reel in opposition to the force of the spring 5'. A portion of the reel shaft 3 projects out through the hole 1a and receives a reel flange 3B that is press-fit onto the shaft and arranged to rotate with the shaft by means of a flat 3C on the shaft. A series of lugs 3D extend axially outwardly from the circumference of the flange 3B. A cam wheel 11 is held in place on the end of the shaft by a C-ring 15 that is received within a groove 3G near the end of the shaft. The cam wheel 11 rotates with the shaft 3 by virtue of the matching of the shape of a central hole 11C in the wheel with a portion of shaft having a flat 3F.

A disk 7 having an annular row of locking ratchet teeth 7A arranged concentrically to the axis of the reel shaft 3 is mounted to the side flange portion 1A of the frame 1 by means of a series of pins 7B that are received in holes in the flange portion. A central flange 7b of the disk is received within the hole 1a in the flange portion 1A and serves as a bushing for the end portion of the shaft. The disk 7 is suitably fastened to the side frame, such as by an adhesive or by heat-staking the pins within the holes in the side flange portion 1A. The shoulders of the ratchet teeth 7A face in a direction opposed to the direction of rotation of the wheel in the unwinding direction, which in the embodiment is counterclockwise as the retractor is viewed from the right in the direction indicated by the arrowed lines A—A in FIG. 1.

Immediately outwardly from the ring 7 is an inertia wheel 8, the inside face of which has a circumferential row of locking ratchet teeth 8B that are complementary to the ratchet teeth 7A. The inertia wheel is received on the reel shaft 3 for limited movement axially between a position in which it is held out against the cam wheel 11 by an inertia spring 14 and a position in which the locking ratchet teeth 8B engage the locking ratchet teeth 7A. The lugs 3D on the reel flange 3B extend into arcuate, elongated slots in the inertia wheel that lie circumferentially with respect to the axis of the shaft 3 and are of such a length as to enable the inertia wheel 8 to rotate relative to the flange through an arc of several degrees. The extent of the rotation is such as to enable cam elements 8C on the outside face of the inertia wheel 8 to work against companion cam elements 11B on the cam wheel 11 through a sufficient rotational distance to cause the inertia wheel to be moved axially toward the ring 7 by the cam elements 8C and 11B for engagement of the locking ratchet teeth 7A and 8B.

When the belt 6 is unwound from the reel at a normal velocity, such as when the belt is being pulled out so that it can be done up manually by the vehicle occupant or so that it can be transferred by a transfer mechanism in the case of a passive restraint belt system, the inertia spring 14 holds the inertia wheel outwardly against the cam wheel. When the belt 6 is unwound from the reel at an unusually high velocity, such as may occur in a sudden stop or collision when the occupant is thrown forward, the inertia of the inertia wheel 11 causes it to lag behind the rotation of the reel, the reel shaft 3 and the cam wheel 11. In the embodiment, again viewing it from the right in FIG. 1 as indicated by the arrowed lines A, the cam wheel 11 rotates counterclockwise. Meanwhile the inertia of the inertia wheel is such as to retard its rate of acceleration so that it lags rotationally behind the cam wheel, the relative counterclockwise rotation of the cam wheel producing an action between the cam elements 8C and 11B that shifts the inertia wheel axially toward the disk 7 so that the locking ratchet teeth 8B on the inertia wheel engage the locking ratchet teeth 7A. Meanwhile the flange 3B rotates with the reel shaft 3 counterclockwise, relative to the inertia wheel, through a distance permitted by the elongated arcuate slots 8D in the inertia wheel. The lengths and the positions of the slots 8D are such that when the locking ratchet teeth 8B and 7A are engaged, the lugs 3D engage the counterclockwise ends of the slots (again viewing the retractor from the right in FIG. 1). Accordingly, the force of rotation of the reel 3 in the counterclockwise, unwinding direction is transmitted from the lugs 3D of the flange into the counterclockwise ends of the slots 8D in the inertia wheel 8, and the inertia wheel in turn transmits those forces into the then-engaged locking ratchet teeth 8B and 7A. The reel is now prevented from rotating any further in the counterclockwise, unwinding direction, and the belt is kept from pulling out and, therefore, restrains the occupant.

In addition to being constructed for locking in response to rapid pulling out of the belt 6, the retractor also includes an inertia responsive device that locks the belt reel in response to an accleration of the vehicle in any direction above a predetermined magnitude. The inertia disk carries a ring 9 having ratchet teeth that extend radially outwardly and face in a direction opposite to the counterclockwise direction of rotation of the belt reel in the unwinding direction (again viewing the retractor from the right in FIG. 1). The inertia responsive device 13 includes a casing 13A that has an annular flange 13C extending up from the bottom portion 13B and serving as a seat for a spherical mass 13D. Normally, the spherical mass rests in a centered, nested position within the flange 13C, but in the event of a determined level of acceleration the mass 13B rolls from the flange 13C and onto an actuating ring portion (not shown) of a pawl 13F, thereby pushing the actuating end of the pawl downwardly and pivoting the tip of the pawl upwardly into engagement with one of the ratchet teeth 9A of the ring 9. The ring rotates relative to the inertia wheel a short distance and is held in a predetermined rotational position on the inertia wheel by a spring 10. This feature facilitates the timing of the two modes of operation, namely response to rapid belt pullout and response to the inertia responsive device. This feature is described in more detail in the above-referred to U.S. patent application.

As described thus far, the construction and mode of operation of the retractor are the same in all respects to the embodiment shown in FIGS. 4 to 6 of the aforementioned U.S. patent application. Let it be assumed at this point that the retractor is in the unlocked position (as shown in FIG. 1) and the belt is being rewound onto the reel 2 at high velocity. The inertia spring 14 keeps the inertia wheel out in its axially outward position in which the locking ratchet teeth 7A and 8B are out of engagement, and the inertia wheel 8 rotates clockwise at the same velocity as the flange 3B and the cam wheel 11. Should the rewinding of the belt 6 be stopped abruptly, the rotation of the cam disk 11 will similarly be stopped rapidly. Meanwhile, the inertia of the inertia wheel 8 may be sufficient to cause it to rotate clockwise relative to the cam wheel, that is, to run ahead of the cam wheel. Such clockwise rotation of the inertia wheel will cause it to rotate relative to the cam wheel in the clockwise direction. This has the same effect as the lagging of the rotation of the inertia wheel in the counterclockwise direction behind the cam wheel which occurs in the event of rapid unwinding of the belt, i.e., working of the cam elements 8C and 11B that results in axially inward movement of the inertia wheel toward the ring 7. It may well be that the locking ratchet teeth 7A and 7B will come into engagement. They will not lock when they engage, but over a period of time they may become worn from moving contact; during the period of time that it takes for the belt reel 2 to stop rotating a considerable amount of rotation of the inertia wheel with interfering contact between the locking ratchet teeth 7A and 8B may occur before the inertia spring 14 restores the inertia wheel to the outward position in which the teeth 7A and 8B no longer contact.

In accordance with the present invention, the interfering contact that can take place between the locking ratchet teeth 7A and 8B when the belt 6 is abruptly stopped from being rewound at a high speed onto the reel 2 is prevented by a brake device. In particular a brake member 20 is mounted by means of a pivot pin 21 to pivot on the cam wheel 11 about an axis that is circumferentially spaced apart, with respect to the axis of the cam wheel 11, from the center of gravity of the brake member 20. A spring 22 is connected between the brake member 20 and the cam wheel 11 and ordinarily holds the brake member 20 inwardly with respect to the axis of the cam wheel 11 in engagement with a stop pin 23. The cover 25 for the locking mechanism of the retractor includes an annular cyclindrical wall portion 25A that is concentric with the axis of rotation of the cam wheel and is located radially outwardly from the trajectory followed by the brake member 20 as it rotates with the cam wheel 11. When the velocity of the cam wheel 11 reaches a predetermined value, as established by the strength of the restraining spring 22, the centrifugal reaction force of the centripetal force on the brake member 20 is sufficient to overcome the force of the spring 22 and pivot the brake member 20 outwardly about the pivot pin 21 and into engagement with the cyclindrical wall portion 25A of the case 25. The frictional engagement between the brake member and the cylindrical wall portion of the case is sufficient to brake the rotation of the cam wheel and, therefore, the belt reel 2. The brake member keeps the velocity of rotation of the belt reel 2 in the winding direction from becoming so great that an abrupt termination of rotation of the belt reel 2 in the winding direction will result in deceleration of the cam wheel 11 of a sufficiently high magnitude as to permit relative clockwise rotation of the inertia wheel and consequent operation of the cam elements and interfering contact between the locking ratchet teeth.

Figure 2:
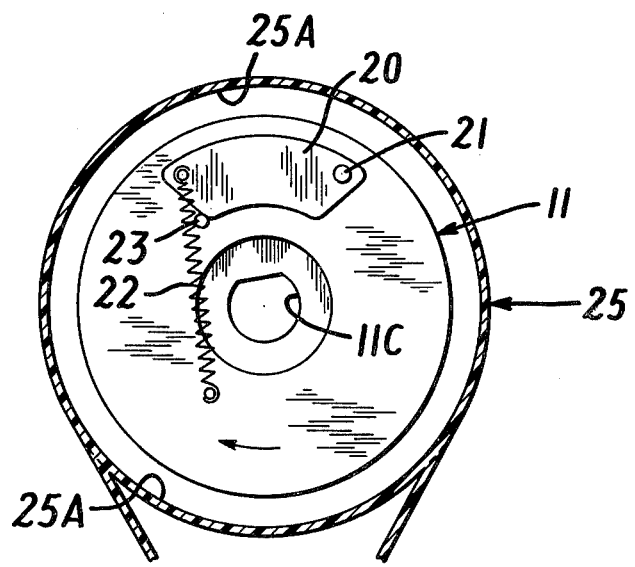
FIG. 2 is a side cross-sectional view (somewhat simplified by not showing parts to the left of the cam wheel) of the locking mechanism of the embodiment of FIG. 1 taken along the lines A—A of FIG. 1 and in the direction of the arrows.

In the above described embodiment of the invention the inertia wheel 8 lies inwardly, with respect to the belt reel, of the cam wheel 11, and it is the inertia wheel that has the locking ratchet teeth by which the belt reel 2 is locked to the retractor frame 1. In the embodiment shown in FIGS. 1 to 3 of the above referred to U.S. patent application, the inertia wheel lies outwardly of the cam wheel, and the cam wheel has the locking ratchet teeth. The present invention is equally applicable to the latter embodiment in that the brake member may be carried by a cam wheel that is located inwardly of the inertia wheel with the same effect of retarding the velocity of rotation of the belt reel in the belt winding direction.

Thus, there is provided, in accordance with the present invention, an improvement in an emergency locking retractor characterized in that the brake member carried by the cam wheel of the locking mechanism is activated by the centrifugal reaction force due to rotation of the cam wheel at a high velocity and is thereby engaged with the circumferential cyclindrical wall portion of the casing to brake the rotation of the belt reel in the winding direction and prevent the abrupt stopping of the rewinding of the belt from producing a high magnitude of deceleration of the cam wheel that could cause working of the cam elements and interfering contact between the locking ratchet teeth. The present invention is of very simple construction, adds only a small amount to the cost of the retractor, and has the important advantage of preventing possibly damaging wear of the locking ratchet teeth due to interfering contact during rewinding. It has no effect on the reliable normal operation of the locking mechanism.

I claim:

1. An emergency locking retractor for a vehicle occupant restraint belt having a frame, a belt reel carried by a shaft that is mounted for rotation in the frame, a rewinding spring urging the reel shaft to rotate in a belt-winding direction to wind the belt onto the reel, a reel locking mechanism carried by a portion of the reel shaft that extends outwardly from a side portion of the frame, the locking mechanism including a circular row of equally spaced-apart first locking ratchet teeth on the outer face of said side portion of the frame and disposed concentrically to the axis of rotation of the reel shaft, a flange affixed on the reel shaft portion outwardly of the frame side portion, an inner wheel received on the reel shaft outwardly of the flange for limited axial movement toward and away from the flange and having a row of second locking ratchet teeth engagable with the first locking ratchet teeth upon movement of the inner wheel toward the frame, an inertia spring engaging the inner wheel and urging it in a direction away from the flange, an outer wheel received on said shaft portion outwardly of the inner wheel and retained thereon against movement in a direction axially of the shaft away from the frame, coacting cam elements on the inner and outer wheels adapted to cam the inner wheel toward the frame upon rotation of one of the wheels relative to the other, one of the wheels being coupled to the shaft for rotation conjointly therewith and the other wheel being rotatably carried on the shaft portion and having an inertia that causes it to lag the rotation of the wheel that rotates with the shaft in response to a selected value of acceleration of the belt in the unwinding direction so that the inner wheel is thereupon shifted toward the frame by the cam elements, and the flange having lugs received in corresponding slots in the inner wheel and adapted to lock the reel shaft to the inner wheel when the inner wheel is locked to the frame by the locking ratchet teeth, and a cover attached to the frame and at least partly enclosing the reel locking mechanism characterized in that there is a brake member carried on the wheel that rotates with the belt reel, and the casing includes a circular cylindrical wall portion located radially outwardly of the path of the brake member, said brake member being movable outwardly into engagement with the cylindrical wall portion in response to a centrifugal reaction force on the brake member, thereby to retard the rotation of the reel and prevent relative rotation of the inner and outer wheels when rotation of the belt reel in the belt-winding direction is stopped abruptly.

2. A retractor according to claim 1 and further characterized in that the brake member is mounted on the wheel to pivot about an axis spaced-apart circumferentially of the wheel from the center of gravity of the brake member and in that there is a spring resiliently urging the brake member away from the cylindrical wall portion of the cover.

* * * * *